US007284095B2

(12) United States Patent
Hu et al.

(10) Patent No.: US 7,284,095 B2
(45) Date of Patent: Oct. 16, 2007

(54) LATENCY-AWARE REPLACEMENT SYSTEM AND METHOD FOR CACHE MEMORIES

(75) Inventors: Zhigang Hu, Ossining, NY (US); William Robert Reohr, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 10/920,844

(22) Filed: Aug. 18, 2004

(65) Prior Publication Data
US 2006/0041720 A1    Feb. 23, 2006

(51) Int. Cl.
G06F 12/00    (2006.01)
G06F 13/00    (2006.01)
G06F 13/28    (2006.01)
(52) U.S. Cl. .................................... 711/133
(58) Field of Classification Search .............. 711/133, 711/134, 129
See application file for complete search history.

(56) References Cited

U.S. PATENT DOCUMENTS

| 4,464,712 | A | 8/1984 | Fletcher |
| 5,224,217 | A | 6/1993 | Zangenehpour |
| 5,737,752 | A | 4/1998 | Hilditch |
| 6,098,152 | A | 8/2000 | Mounes-Toussi |
| 6,272,598 | B1 * | 8/2001 | Arlitt et al. .............. 711/133 |
| 6,360,303 | B1 * | 3/2002 | Wisler et al. ............. 711/152 |
| 6,408,362 | B1 * | 6/2002 | Arimilli et al. ............ 711/133 |
| 6,671,780 | B1 | 12/2003 | Lu et al. |
| 6,848,026 | B2 * | 1/2005 | DeSota et al. ............. 711/129 |
| 2002/0049889 | A1 * | 4/2002 | Hoogerbrugge et al. .... 711/134 |
| 2003/0023827 | A1 | 1/2003 | Palanca et al. |

OTHER PUBLICATIONS

C. Kim et al.; An Adaptive, Non-Uniform Cache Structure for Wire-Delay Dominated On-Chip Caches; Computer Architecture and Technology Laboratory, Dept. of Computer Sciences, The University of Texas at Austin; Proceeding of the 10th Int'l Conf on ASPLOS); Oct. 5-9, 2002; pp. 1-12.
Z. Chishti et al; Distance Associativity for High-Performance Energy-Efficient Non-Uniform Cache Architectures; School of Elec. & Comp. Engineering, Purdue U; Proceeding of the 36th Int'l Symposium on Microarchitecture (MICRO-36), Dec. 3-5, 2003; 12 pages; IEEE Computer Society.

* cited by examiner

Primary Examiner—Matthew Kim
Assistant Examiner—Edward J Dudek
(74) Attorney, Agent, or Firm—Keusey, Tutunjian & Bitetto, P.C.; Mark Wardas

(57) ABSTRACT

A method for replacing cache lines in a computer system having a non-uniform set associative cache memory is disclosed. The method incorporates access latency as an additional factor into the existing ranking guidelines for replacement of a line, the higher the rank of the line the sooner that it is likely to be evicted from the cache. Among a group of highest ranking cache lines in a cache set, the cache line chosen to be replaced is one that provides the lowest latency access to a requesting entity, such as a processor. The distance separating the requesting entity from the memory partition where the cache line is stored most affects access latency.

11 Claims, 5 Drawing Sheets

300

| ADDRESS LRU-1 | REGION LRU-1 | ADDRESS LRU | REGION LRU | REPLACEMENT TYPE | ADDRESS SELECTED FOR REPLACEMENT |
|---|---|---|---|---|---|
| 00 | LOCAL | 01 | LOCAL | LRU | 01 |
| 10 | LOCAL | 00 | LOCAL | LRU | 00 |
| 00 | LOCAL | 10 | REMOTE | LRU-1 | 00 |
| 00 | LOCAL | 11 | REMOTE | LRU-1 | 00 |
| 01 | LOCAL | 10 | REMOTE | LRU-1 | 01 |
| 01 | LOCAL | 11 | REMOTE | LRU-1 | 01 |
| 10 | REMOTE | 00 | LOCAL | LRU | 00 |
| 10 | REMOTE | 01 | LOCAL | LRU | 01 |
| 11 | REMOTE | 00 | LOCAL | LRU | 00 |
| 11 | REMOTE | 01 | LOCAL | LRU | 01 |
| 10 | REMOTE | 11 | REMOTE | LRU | 11 |
| 11 | REMOTE | 10 | REMOTE | LRU | 10 |
|  |  |  |  |  |  |

Address=Way Address

FIG. 3

LATENCY-AWARE REPLACEMENT SYSTEM AND METHOD FOR CACHE MEMORIES

BACKGROUND OF THE INVENTION

1. Field of the Invention

The present invention generally relates to cache memory in computer systems, and more particularly to cache replacement systems and methods for reducing latency in non-uniform cache architectures.

2. Description of the Related Art

On-chip cache memories are usually size-limited by area, power, and latency constraints. These cache memories are often not able to accommodate the whole working set of a given program. When a program references a piece of data that is not present in the cache, a cache miss occurs and a request is sent to a next level of the cache hierarchy for the missing data. When the requested data eventually arrives from the next level, a decision must be made as to which data currently in the cache should be evicted to make room for the new data.

These algorithms are called cache replacement algorithms. The most commonly employed cache replacement algorithms are random, first in first out (FIFO), and least recently used (LRU). Except for the random replacement algorithm, all replacement algorithms base their replacement decision on a ranking of all cache lines in the set where the new data will be stored. For example, the LRU replacement algorithm tracks the access ordering of cache lines within a cache set, while the FIFO replacement algorithm ranks the cache lines by their allocation order. The least recently accessed/allocated cache lines are given the highest ranking and upon cache miss, they are chosen to be replaced.

Prior work on replacement algorithms does not consider the access latency to each cache line, because in logic-dominated cache designs all cache lines have the same access latency. Recently, wire delay has played a more significant role in access latencies. Consequently, access latencies to different cache partitions have grown further apart. Therefore, there is a need for a new cache replacement algorithm that considers access latencies while formulating a replacement decision to reduce average latencies to lines stored in different partitions of a cache.

SUMMARY OF THE INVENTION

A method for replacing cache lines in a computer system having a non-uniform set associative cache memory is disclosed. The method incorporates access latency as an additional factor into the existing ranking guidelines for replacement of a line, the higher the rank of the line the sooner that it is likely to be evicted from the cache. Among a group of highest ranking cache lines in a cache set, the cache line chosen to be replaced is one that provides the lowest latency access to a requesting entity, such as a processor. The distance separating the requesting entity from the memory partition where the cache line is stored most affects access latency.

A method for caching memory to account for non-uniform access latencies includes determining a latency difference among lines mapped to an arranged memory device. In accordance with a replacement policy, the lines are ranked in the arranged memory device, and a line with a smallest latency from among lines with a lowest priority grouping is selected for replacement. The priority grouping may include lines with a single ranking value or form a group of lowest ranking values (e.g., the lowest group may include multiple low ranking values).

A cache system includes a cache servicing at least one requesting entity, a replacement policy that determines priority rankings for cache lines to be replaced during memory operations and a selection circuit. The selection circuit determines latency differences among the cache lines and selects, for replacement, a cache line that has a lowest latency to the at least one requesting entity from among the cache lines with a lowest priority grouping.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 3 is a truth table showing the use of address information in accordance with one implementation of the present invention;

DETAILED DESCRIPTION OF PREFERRED EMBODIMENTS

Figure 1:
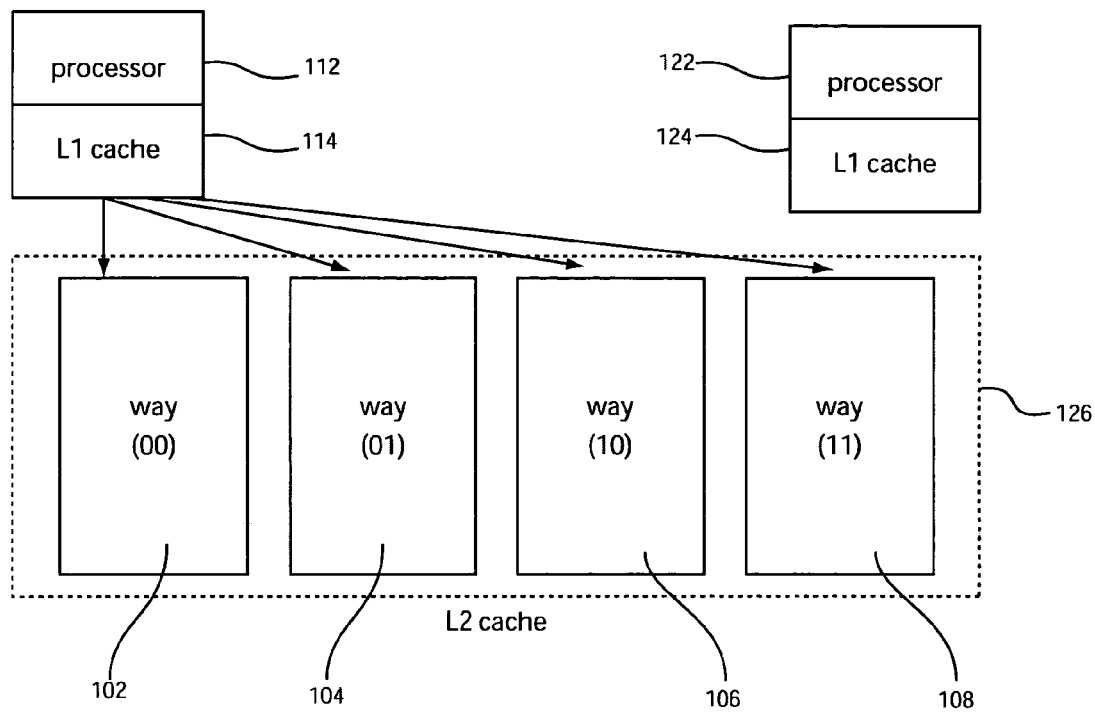
FIG. 1 is block diagram of an exemplary computer system that includes two processors each having its private level 1 (L1) cache and both sharing a level 2 (L2) cache, where the L2 cache is divided into multiple partitions, each having a different latency to the processor.

The present invention provides improvements on previous cache replacement methods by factoring into the replacement decision access latency for each cache line. More particularly, among those cache lines that have the highest ranking based on conventional replacement algorithms, the present invention picks the cache line that is closest to the requesting processor as the replacement block. In the context of the present invention, a higher ranked line is more likely to be replaced sooner than a lower ranked line.

The concepts of the present invention can be exemplified by considering a four-way set-associative cache. In a given set, each of the four cache lines is assigned a priority to stay in the cache, with 0 being the highest priority, and 3 being the lowest priority. When a replacement is needed, the cache line with the lowest priority (3) is chosen to be evicted. In a conventional least recently used (LRU) replacement algorithm, the cache lines are sorted according to their access ordering, with the highest priority assigned to the most recently used (MRU) cache line, and the lowest priority to the least recently used (LRU) cache line. It should be understood that in the context of the present invention, a high rank for replacement is given to a lower priority line.

In addition to access ordering, the present invention considers the access latency of each cache line when evaluating its priority. Two examples of the present invention include the following. First, of the two cache lines that have the smallest access latency, the one that is less recently used is chosen to be the replacement cache line. Second, of the two cache lines that are least recently used, the one that has smaller access latency is chosen to be the replacement cache line.

The present invention teaches ways to factor in access latency into the choice of which line within a set of lines to evict. While the LRU algorithm is used to illustrate the invention hereafter, other ranking policies could be used in place of the LRU that are still within the spirit or scope of the present invention.

It should be understood that the elements shown in FIGS. 1-5 may be implemented in various forms of hardware, software or combinations thereof. Preferably, these elements are implemented in hardware in the form of memory chips or devices and software on one or more appropriately programmed general-purpose digital computers or computer chips having a processor and memory and input/output interfaces. Referring now to the drawings in which like numerals represent the same or similar elements and initially to FIG. 1, a partial schematic diagram is shown of a computing system 100 used to illustrate the operation and function of one embodiment of the present invention. System 100 includes an exemplary L2 (second level) set associate cache 126 partitioned into four physically separate ways 102, 104, 106, 108, a processor 112 and its private L1 (first level) cache 114, a processor 122 and its private L1 (first level) cache 124. A smaller or larger distance from one of the processors 112, 122 to one of the ways 102, 104, 106, 108 indicates smaller or larger access latency, respectively, to retrieve a line from the way or store a line in the way.

In one general case, the present invention deals with latencies rather than distance, but for most practical implementations, distance is the only factor that differentiates one way from another. However, there is the possibility that at least one of the ways 102, 104, 106, 108 could employ faster random access memory (RAM) while another of the ways 102, 104, 106, 108 within the same L2 cache 126 could employ slower random access memory, such as dynamic RAM (DRAM).

In this example, differences in latencies to retrieve a line from the ways 102, 104, 106, 108 primarily result from differences in access times between the two memory technologies rather than differences in distances from the processor to the ways 102, 104, 106, 108.

Two of the ways, way 106 and way 108 are "distant" from processor 112 and will be thus referred to as remote ways 106, 108. Two of the ways, way 102 and way 104, are "closer" to processor 112 and will be thus referred to as local ways 102, 104. The round trip distance covered in retrieving a line from one of the ways 102, 104, 106, 108 significantly impacts the total access latency. In other words, for processor 112, the access latency in retrieving a line from remote ways 106, 108 is larger than the access latency in retrieving a line from the local ways 102, 104.

For processor 122, the converse is true. The access latency in retrieving a line from its local ways 106, 108 is smaller than the access latency in retrieving a line from its remote ways 102, 104. The present invention alters the line replacement policy to reduce the average latency to access the ways 102, 104, 106, 108 by placing the mostly likely to be used data in the local ways.

Figure 2:
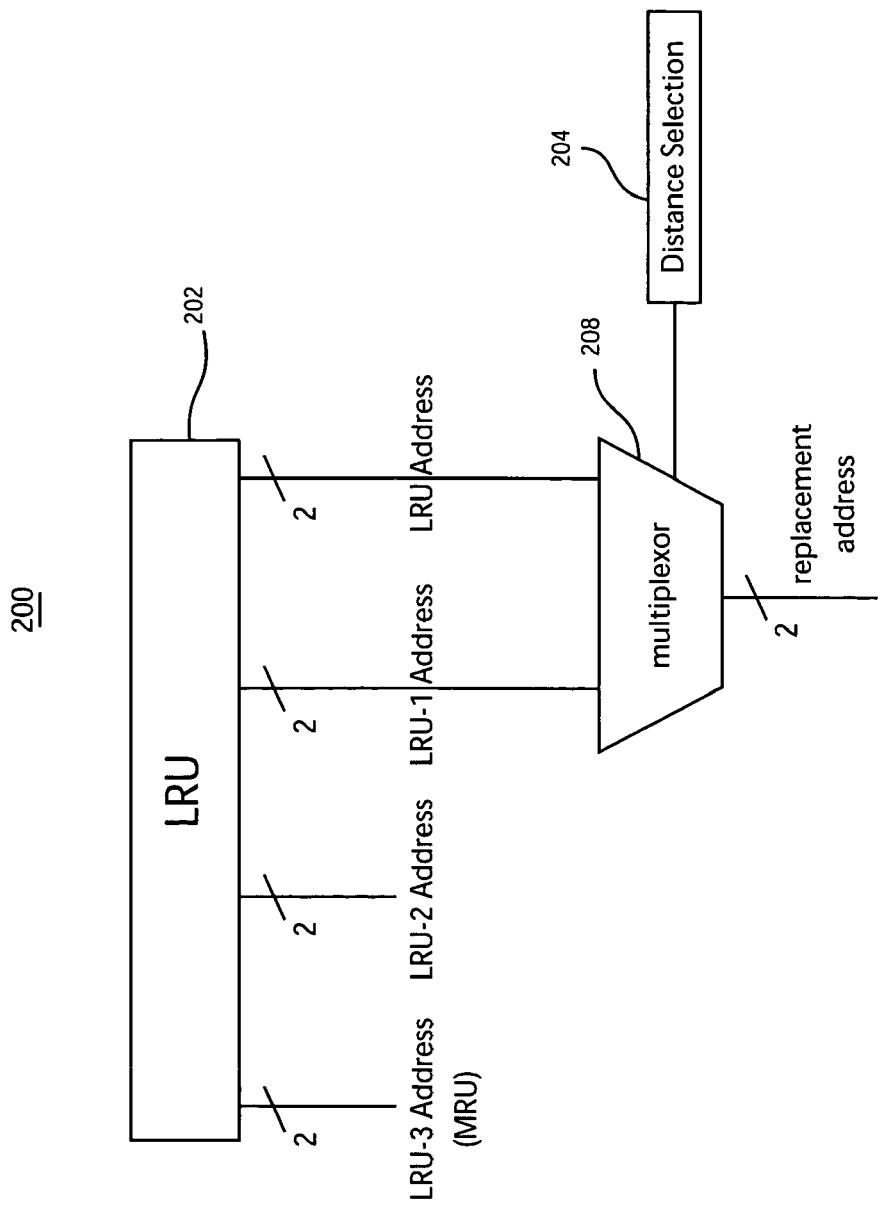
FIG. 2 is a schematic diagram of an embodiment of the present invention illustratively depicting addresses of least recently accessed cache lines, where the closer line to the requesting processor is chosen to be replaced.

Referring to FIG. 2, a modified LRU circuit 200 is shown in accordance with an illustrative embodiment of the present invention. Circuit 200 comprises a LRU circuit 202 (or other ranking method circuit or device), a distance selection control logic 204, and multiplexer 208. When a miss is encountered, the LRU circuit 202 provides a ranking to evict one of the four lines stored in one of the four ways 102, 104, 106, 108 of FIG. 1, freeing space for a replacement line.

The ranking spans from the first line to evict, "LRU," the next line to evict, "LRU-1," the line thereafter to evict, "LRU-2," and the final line to evict, "LRU-3" (or in this example the most recently used line). The multiplexer 208 provides the address of the way, which stores the line to be evicted, henceforth referred to as replacement address. Either the "LRU" line or "LRU-1" line is evicted. The distance selection control logic 204 determines which of the two lines to evict based not on LRU ranking but on their relative proximity to the requesting entity.

Since the replacement line is most likely to be requested again (it is the MRU line), it should be stored in the way nearest to the requesting entity that has the lowest access latency. However, exclusively relying on this placement policy would render the LRU, which takes advantage of temporal locality, ineffective. A compromise between these two sometimes-competing replacement policies is achieved in the modified LRU circuit 200.

The combined function of LRU circuit 202, distance selection control logic 204, and the multiplexer 208 is described in an exemplary truth table 300 of FIG. 3.

In this example, all addresses (way addresses) in FIG. 2 are two bits and map to ways 102, 104, 106, 108, as depicted in FIG. 1. As depicted in FIG. 3, local way 102 is assigned to address "00," local way 104 is assigned to address "01," remote way 106 is assigned to address "10," and remote way 108 is assigned to address "11" and so on as shown in FIG. 3.

For illustrative purposes, the modified LRU circuit 200 of FIG. 2 and its corresponding truth table of FIG. 3 implement the logic to drive the line replacement policy for processor 112 of FIG. 1 only. When this replacement policy is extended to a multiplicity of processors, such as processors 112, 122, sharing a common cache, such as L2 cache 126, significant value is realized in accordance with the present invention (see FIG. 1).

Figure 4:
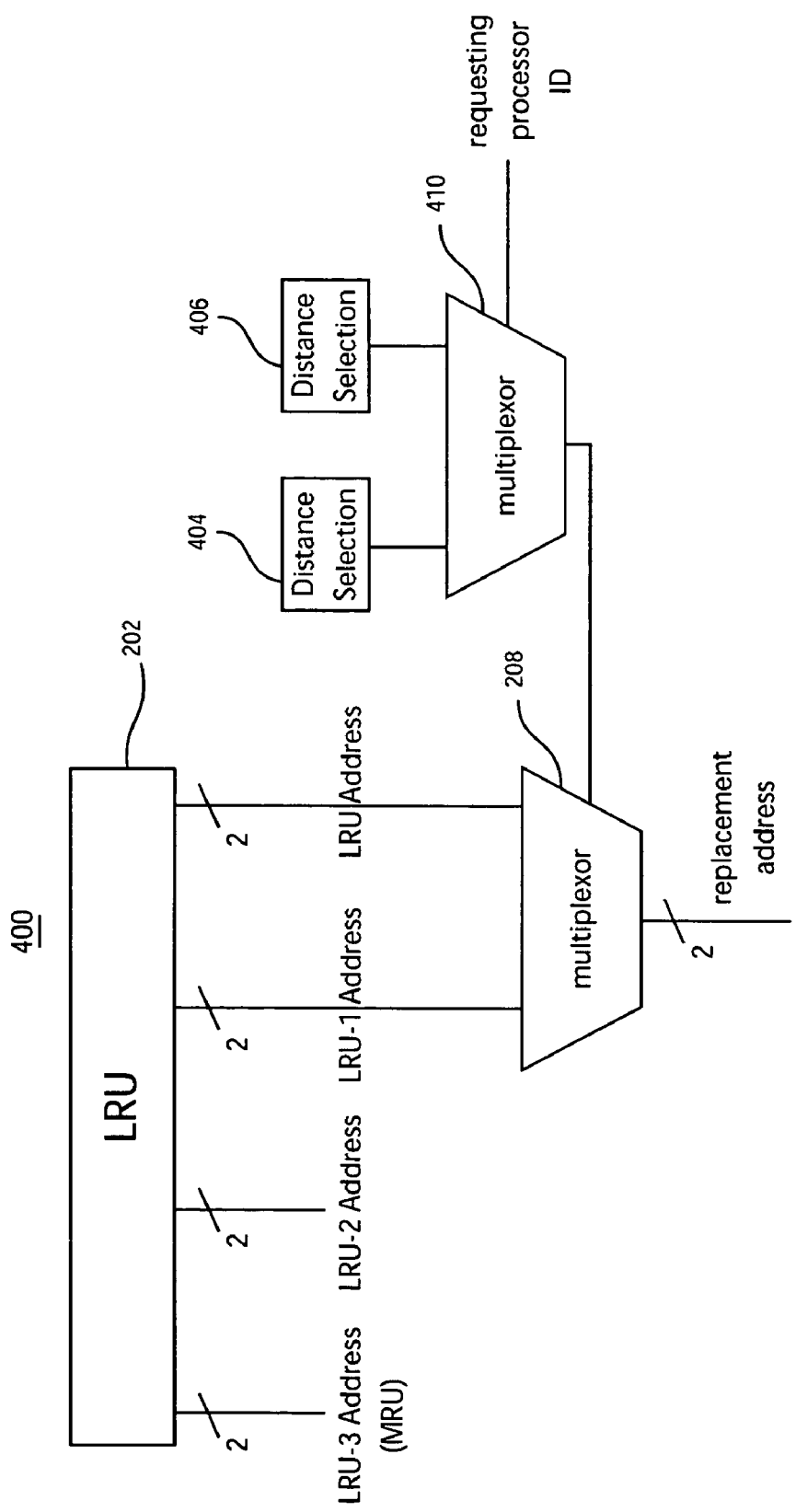
FIG. 4 is a schematic diagram of a preferred embodiment of a latency-aware replacement method applied to a L2 cache serving a multiplicity of processors in accordance with the present invention.

FIG. 4 shows how a modified LRU circuit 400 may be applied to a computer system that has multiple processors as will be explained with continued reference to FIG. 1. Since each processor 112, 122 has its own view of local and remote ways 102, 104, 106, 108, each of the ways needs its own distance selection control logic. More specifically, distance selection control logic 404 is associated with processor 112, while distance selection control logic 406 is associated with processor 122.

When a replacement occurs, the LRU logic 202 provides the LRU ranking of all the cache lines in the replacement set. One of the two lowest ranking cache lines, the LRU (least recently used) line and LRU-1 (second least recently used) line, will be chosen by multiplexer 208 as the replacement line. The multiplexer 410 chooses the distance selection control logic (404 or 406) that is associated with the processor that caused the L2 cache 126 to process a miss. For example, if the replacement line is needed by processor 112, then the signal from distance selection logic 404 controls the selection of the replacement address through multiplexer 208, so that the cache line closer to processor 112 is replaced by the new replacement line.

Through multiplexer 410, the requesting processor ID selects the appropriate distance selection control logic, either 404 or 406, to drive the selection of the replacement address. So, for example, had processor 122 needed the new replacement line, the distance selection logic 406 would have controlled the selection of the replacement address through multiplexer 208.

Figure 5:
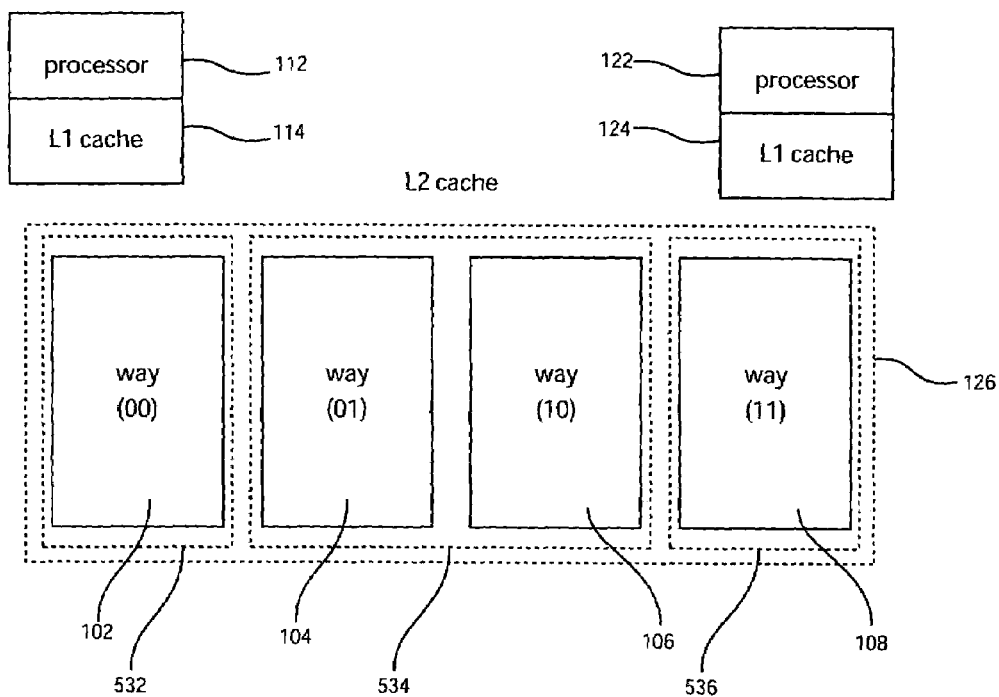
FIG. 5 is block diagram of the system of FIG. 1, with the latency-aware replacement method applied to the L2 cache in accordance with one embodiment of the present invention.

Referring to FIG. 5, consequences of applying the modified LRU circuit 400 of FIG. 4 to the computer system 100 of FIG. 1 are illustratively described and shown. The L2 cache is logically divided into 3 partitions 532, 534, and 536. Since cache lines in partition 532 have to travel the greatest distance to reach processor 122, the cache lines will not be replaced by data loaded by processor 122. When processor 122 requests new data not in L2 cache 126; the replacement algorithm picks the replacement address from the two least recently used cache lines, e.g., a cache line that is closer. In other words, partition 532 only holds data requested by processor 112. Similarly, partition 536 only holds data requested by processor 122. On the other hand, partition 534 in the middle of L2 cache 126 holds data requested by both processors 112, 122.

In summary, the modified LRU circuit 400 provides each processor with exclusive management rights over a private partition and shared management rights over other shared partitions. Note that the relative sizes of the partitions are a function of the replacement implementation in FIG. 4. Advantageously, the cache memory remains passive as to the partitioning. The partitioning is a function of the implementation constraints set up by the cache policies put in place for the processors or other devices, which employ cache memory.

While the present invention has been described in terms of cache memory, the teachings of the present invention may be extended to any distributed memory system. In addition, the use of distance (or other latencies) as an additional factor for replacement decisions may be generalized to other systems beyond LRU replacement algorithms in multiple way set associative caches. For example, the present invention can be applied to other replacement algorithms, such as random replacement, and FIFO replacement algorithms, etc. Furthermore, distance may be considered after the LRU ordering. This can be generalized to any ordering within the spirit of this invention.

Having described preferred embodiments of latency-aware replacement system and method for cache memories (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for caching memory to account for non-uniform access latencies, comprising steps of:
   determining a latency difference among lines mapped to a cache memory device by associating selection circuits with portions of the cache memory device such that each selection circuit determines the latency for lines and manages line selection for each of a plurality of a requesting entities wherein associating selection circuits with portions of the cache memory device includes associating a selection circuit with a processor such that due to latency constraints a portion of the cache memory closest to the processor is used solely by an associated processor;
   in accordance with a replacement policy, ranking the lines in the cache memory device; and
   selecting for replacement a line with a smallest latency between each requesting entity and positions in the cache memory device from among lines in the cache memory with a lowest priority grouping in accordance with a selection circuit associated with the requesting entity.

2. The method as recited in claim 1, wherein the step of determining includes determining the latency difference based upon a distance from a position in the cache memory device to a requesting entity.

3. The method as recited in claim 2, wherein the step of determining the latency difference is based upon a distance from a processor.

4. The method as recited in claim 3, wherein the cache memory device is a set associative cache memory and step of determining the latency difference is based upon a distance from one or more processors to a plurality of ways in the set associative cache memory.

5. The method as recited in claim 1, wherein the step of, in accordance with a replacement policy, ranking the lines in the cache memory device includes a least recently used (LRU) replacement policy and the step of ranking is based on assigning least recently used lines with the lowest priority.

6. A program storage device readable by machine, tangibly embodying a program of instructions executable by the machine to perform method steps for caching memory to account for non-uniform access latencies as recited in claim 1.

7. A cache system comprising:
   a cache servicing at least one requesting entity;
   a replacement policy which determines priority rankings for cache lines to be replaced during memory operations wherein the system includes multiple processors and a shared cache, which is logically divided into multiple partitions based on the replacement policy; and
   a selection circuit which determines latency differences between the at least one requesting entity and positions among the cache lines of the cache and selects, for replacement, a cache line that has a lowest latency to the at least one requesting entity from among the cache lines with a lowest priority grouping.

8. The system as recited in claim 7, wherein the selection circuit determines latency based on a distance from the cache to the at least one requesting entity.

9. The system as recited in claim 7, wherein the replacement policy includes a least recently used circuit to determine least recently used lines for the priority ranking.

10. The system as recited in claim 7, wherein the selection circuit includes a plurality of selection circuits, each selection circuit being associated with a different requesting entity.

11. The system as recited in claim 7, wherein the partitions include private partitions for each processor, and common partitions shared by the multiple processors.

* * * * *